United States Patent
Buckley et al.

(10) Patent No.: US 7,917,136 B2
(45) Date of Patent: *Mar. 29, 2011

(54) APPARATUS, AND ASSOCIATED METHOD, FOR FACILITATING FORMATION OF A CALL CONNECTION IN A RADIO COMMUNICATION SYSTEM WITH A SERVICE CENTER IDENTIFIED BY A SHORT DIALING CODE

(75) Inventors: Adrian Buckley, Tracy, CA (US); Bokinakere Subbarao Sundresh, Basingstoke (GB)

(73) Assignee: Research In Motion Limited, Waterloo (CA)

( * ) Notice: Subject to any disclaimer, the term of this patent is extended or adjusted under 35 U.S.C. 154(b) by 795 days.

This patent is subject to a terminal disclaimer.

(21) Appl. No.: 11/302,888

(22) Filed: Dec. 14, 2005

(65) Prior Publication Data
US 2007/0135144 A1 Jun. 14, 2007

(51) Int. Cl.
*H04W 4/00* (2009.01)
(52) U.S. Cl. .................. 455/432.1; 455/428; 455/456.1; 455/466; 455/560; 455/564
(58) Field of Classification Search .................. 455/466, 455/432.1, 428, 456.1, 560, 564
See application file for complete search history.

(56) References Cited

U.S. PATENT DOCUMENTS

| | | | |
|---|---|---|---|
| 6,366,780 B1 * | 4/2002 | Obhan | 455/453 |
| 6,526,267 B1 * | 2/2003 | Jokimies et al. | 455/161.1 |
| 2002/0037750 A1 * | 3/2002 | Hussain et al. | 455/564 |
| 2003/0143977 A1 * | 7/2003 | Mittal | 455/406 |
| 2005/0003803 A1 | 1/2005 | Buckley | |

FOREIGN PATENT DOCUMENTS

| | | |
|---|---|---|
| WO | 00/41421 A | 7/2000 |
| WO | 2004071115 A | 12/2005 |

* cited by examiner

*Primary Examiner* — Pierre-Louis Desir (57) ABSTRACT

Apparatus, and an associated method, for facilitating call connection with a selected service center from a mobile node. A mobile node is provided with short dialing codes used in a network with which the mobile node is registered by SMS messages sent thereto, such as pursuant to registration procedures. Values of the short dialing codes downloaded to the mobile node are stored at a storage location, such as at a SIM card, indexed together with corresponding codes normally used by a user of the mobile nodes, such as the codes used in the home network of the mobile node. When a user places a call to a service center, the stored values are retrieved, and transposed, if needed, to ensure better that the call to the selected service center is successfully completed.

23 Claims, 3 Drawing Sheets

APPARATUS, AND ASSOCIATED METHOD, FOR FACILITATING FORMATION OF A CALL CONNECTION IN A RADIO COMMUNICATION SYSTEM WITH A SERVICE CENTER IDENTIFIED BY A SHORT DIALING CODE

FIELD OF THE INVENTION

The present invention relates generally to a manner by which to facilitate formation of a call connection of a call originated by a user of a mobile node placed to a service center, identifiable by a short dialing code, such as a 9-1-1 or 9-9-9 dialing code. More particularly, the present invention relates to apparatus, and an associated method, by which to permit user-entered dialing digits to be transposed into dialing digits used to identify a selected service center at the network at which the mobile node is registered, thereby to permit a call connection to be formed with the service center.

BACKGROUND OF THE INVENTION

Many aspects of modern society require the use of modern communication systems through which to communicate information to effectuate a communication service. Many varied types of communication systems have been developed to permit the effectuation of many different types of communication services. Scientific discoveries and technological advancements have permitted, and continue to permit, new types of communication systems to be developed and deployed. New communication systems generally permit information to be communicated at increased rates and from, and between, locations at which communications previously had been unavailable.

Amongst the advancements that have been adapted for use in many modern communication systems, are advancements in digital communication technologies. The use of digital communication techniques provide various advantages, mainly related to the ability to provide improved communication efficiencies in the communication system in which the digital communication techniques are utilized. And, the information, once digitized, can be communicated during discrete intervals.

A radio communication system is an exemplary type of communication system. Information is communicated between communication stations of a radio communication system upon radio communication channels defined upon a portion of the electromagnetic spectrum. Many radio communication systems make use of digital communication techniques to effectuate communications between radio communication stations operable therein. Due to the bandwidth limitations regularly associated with radio communication systems, the use of digital communication techniques is particularly advantageous when adapted for use in a radio communication system.

Radio communication systems provide various advantages in contrast to wireline counterparts. For instance, costs associated with the initial installment and deployment of a radio communication system are generally less than the corresponding costs required to install and deploy a wireline counterpart. And, a radio communication system is amenable for implementation as a mobile communication system. In a mobile communication system, mobility of communications is provided to one, or more, of the communication stations.

A cellular communication system is a type of radio communication system. The network infrastructures of successive generations of cellular communication systems have been installed over significant portions of the populated areas of the world. And, such systems have achieved significant levels of usage. While the types of communication services that are effectuable by way of a cellular communication system are increasing, cellular communication systems are still used, in significant part, to effectuate telephonic communication of voice information.

Telephonic communications are typically effectuated in a cellular communication system through the use of a mobile station. A mobile station is portable radio transceiver, typically of dimensions permitting their hand carriage by a user. The user purchases access to communicate by way of the mobile station through the communication system or otherwise purchases access to the system.

A GSM (Global System for Mobile communications) cellular communication system is exemplary of a cellular communication system that utilizes digital communication techniques. The GSM system operates pursuant to the standards and protocols set forth in an operational specification promulgated by the ETSI (European Telecommunications Standards Institute). The GSM system defines a communication scheme that utilizes a combination of frequency division multiple access (FDMA) and time division multiple access (TDMA) communication schemes. Networks constructed to be operable pursuant to the operational specification of the GSM system have been installed throughout many areas. And, the GSM system has become one of the, if not the, dominant cellular communication system-types in the world. An IS-95 (Interim Standard 95) cellular communication system is another exemplary cellular communication system. An IS-95 system utilizes a CDMA (code division multiple access) communication scheme. And operating standards for a UMTS (universal mobile telephone service) system are undergoing development.

Mobile stations operable in a GSM system, as well as other mobile stations, are constructed, typically to mimic operation of conventional telephonic stations. That is to say, mobile stations are typically operable both to originate and to terminate telephonic calls in manners that correspond, at least from the perspective of the user, to manners by which conventional telephonic stations are utilized to originate and terminate telephonic calls.

Calls placed elsewhere are terminated at the mobile station through formation of a call connection, and calls are originated at the mobile station for termination elsewhere by way of a call connection. Pursuant to call placement, signaling is generated with the mobile station pursuant to a call set-up procedure. When a call is terminated at a mobile station, an alert, such as a ringing tone, is caused to be generated at the mobile node as part of the set-up procedure. The alert alerts the user of the mobile station of the placement of the call to the mobile station. And, the user of the mobile station permits formation of the call connection by acceptance of the call responsive to the alert. The call is accepted in a manner analogous to the manner by which the user of the conventional wireline device takes a wireline station off-hook.

When a call is originated at the mobile station, the user initiates the origination of the call by entering dialing digits that identify the terminating station, i.e., the called party, at which the call is intended to be placed, or terminated. Upon entry of the dialing digits, call signaling procedures are performed to set-up the call. The call signaling procedures are generally transparent to the user.

Short codes are sometimes used to identify certain designated service centers in some areas. That is to say, short dialing codes identify the certain designated service centers. In the United States, for instance, some areas have 9-1-1 emergency service centers. The 9-1-1 code is sometimes referred to as an emergency number. A person placing the request for emergency assistance enters the 9-1-1 code at a telephonic station. The call is routed to an appropriate 9-1-1 service center. The 9-1-1 service center provides facilities for quick response to the call. But, in other areas, different codes other than the 9-1-1 code, are used to identify the emergency service center. For instance, in the United Kingdom, an emergency service center is accessed telephonically from a telephonic station through entry of a 9-9-9 code.

Short dialing codes are sometimes also utilized to identify other service centers. For instance, directory service centers are accessed telephonically in some areas of the United States through the entry of a 4-1-1 code. In parts of the United Kingdom, a directory service center is accessed telephonically through the entry of a 1-9-2 code. Also analogously, operator assistance is accessed telephonically in some areas through entry of the dialing digit '0'. In some other areas, the operator assistance is accessed through entry of the short code 1-0-0.

A user of the mobile node is generally aware of the short dialing digits that identify selected service centers in the area in which the user of the mobile station is accustomed. However, due to the mobility inherent of the mobile node, the mobile node might be positioned in an area that utilizes other dialing digits to identify selected service centers than the dialing digits with which the user is accustomed. For instance, the user of the mobile node might be accustomed to the dialing digits 9-1-1 to identify an emergency service center. But, the user, together with the mobile station, might be positioned in an area in which other dialing digits, such as the 9-9-9 dialing code is used to identify the emergency service center. If the dialing code is associated with a service center that the user of the mobile station intends to call differs with the dialing code that is used in the area from which the call is placed, the call is not routed to the proper service center.

A manner is needed, therefore, by which better to provide for placement of a call from a mobile station to a service center identified by a short dialing code. That is to say, a manner is needed by which to take into account the mobility inherent of a mobile station so that a service center that is accessed through entry of short dialing digits by a user of a mobile station remains accessible irrespective of the position of the mobile station when the call is placed to the service center.

It is light of this background information related to call placement of a call to a service center by way of a radio communication system that the significant improvements to the present invention have evolved.

DETAILED DESCRIPTION

The present invention, accordingly, advantageously provides apparatus, and an associated method, by which to facilitate formation of a call connection of a call originated by a user of a mobile node placed to a service center and identifiable by a short dialing code, such as a 9-1-1 or 9-9-9 dialing code.

Through operation of an embodiment of the present invention, a manner is provided by which to permit user-entered dialing digits to be transposed into dialing digits used to identify a selected service center.

A call connection is formed even if the short dialing code used at the network into which the mobile station roams differs with the dialing code normally used by the user to originate a call to the service center.

In one aspect of the present invention, the short dialing codes that identify service centers in the area at which the mobile station is positioned are downloaded to the mobile station upon registration of the mobile station with the network. When the mobile station enters into another area necessitating renewed registration, the short dialing codes are again downloaded to the mobile station so that current short dialing code values are stored and maintained at the mobile station.

The user of the mobile node need only be aware of the short dialing codes with which the user is normally associated, or otherwise cause entry of the dialing digits, such as by way of a speed-dialing procedure. That is to say, the dialing digits normally used by the user continue to be used to identify the service center upon initiation of an origination of a call to a service center. The entered digits, however, are transposed, if necessary, at the mobile node into a number that permits the call connection to be formed.

In one aspect of the present, downloaded, short dialing codes, downloaded to the mobile node, such as during registration of the mobile node, are stored at the mobile node. Subsequently, when a user of the mobile node initiates origination of a call to a selected service center, the dialing digits entered, or caused to be entered, by the user are indexed together with corresponding values downloaded to the mobile node. The corresponding value, i.e., the values corresponding to the entered values, are substituted for the entered dialing digits, and the call is placed to the calling station identified by the substitute dialing digits. That is to say, the entered dialing digits are transposed into other dialing digits to permit completion of the call.

In another aspect of the present invention, the downloaded dialing digits, downloaded to the mobile node, are stored at a storage element that permits updating of the memory contents thereof. In a GSM, or other analogous, cellular communication system that utilizes SIM (Subscriber Identity Module) cards, the downloaded short dialing codes are stored at an SIM card of the mobile node. When a call to a service center is subsequently initiated, the entered dialing digits associated with the initiation of the origination of the call to the service are indexed together with corresponding values stored at the SIM card. The corresponding values are substituted for the entered values, and the call is placed to the service center using the dialing digits appropriate for the area at which the mobile node is positioned. In an IS-95, or other analogous, cellular communication system that utilizes R-UIM cards, the short dialing codes are stored at the R-UIM (Removable User Identity Module) card of the mobile node.

In one implementation, pursuant to registration of the mobile node with the network, an SMS (Short Message Service) message is sent to the mobile node. The SMS message is formed, e.g., of an Envelope command message in which the short dialing digit used to identify service centers at which the mobile node is positioned are encapsulated therein. When received at a receive part of the mobile node, the SMS message is forwarded to the SIM card, and the encapsulated values are stored at the SIM card. When the mobile node subsequently re-registers, another SMS message is downloaded to the mobile node, and the updated values of the dialing codes are stored over the existing dialing codes at the SIM card.

Thereby, the user of the mobile node is able to originate a call to a selected service center using short dialing digits known to the user. Substitution of the short dialing digits used in an area at which the mobile node is positioned is performed to permit call connection of the call to the appropriate service center. Delayed call connection, or failure to form call connections, are less likely to occur through operation of an embodiment of the present invention.

In these and other aspects, therefore, apparatus, and an associated method, is provided for a radio communication system having a mobile node operable by a user to communicate with a network part of a communication network. At least a first service center is coupled to the network part. A call originated by the user at the mobile node is selectably routable to a selected one of the at least the first service center to form a call connection therebetween. Routing of the call to the selected one of the at least the first service center is facilitated. A first storage element stores first values that identify the at least the first service center. A selected one of the first values is used by the user of the mobile node when initiating origination of the call to the selected one of the at least the first service center. A second storage element stores second values that identify the at least the first service center. The second values are used at a network part of the communication network at which the mobile node is presently registered. An indexer is coupled to the first storage element and to the second storage element. The indexer indexes together the selected one of the first values, when used by the user to initiate origination of the phone call, to a corresponding one of the second values.

Figure 1:
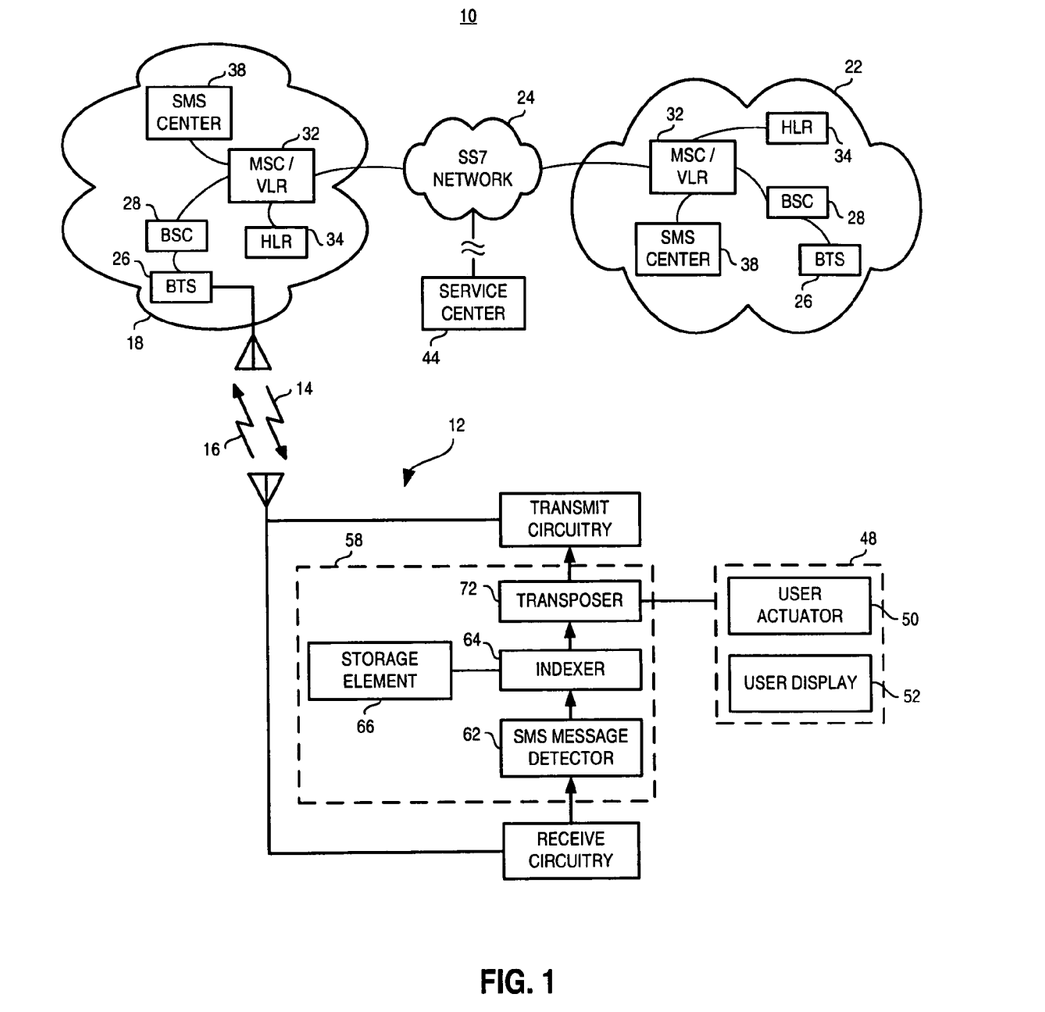
FIG. 1 illustrates a functional block diagram of a radio communication system in which an embodiment of the present invention is operable.

Referring first to FIG. 1, a mobile communication system, shown generally at 10, provides for communications with mobile nodes that are permitted mobility at least throughout the area encompassed by the communication system. A representative mobile node 12 is shown in the Figure. In the exemplary implementation, the communication system forms a multi-user system permitting of a plurality of concurrent communication sessions with a plurality of mobile nodes. Additional mobile nodes can also be represented in the Figure, analogous to the representation of the mobile node 12 to represent other mobile nodes with which other communication sessions are effectuated.

In the exemplary implementation shown in the Figure, the communication system 10 forms a cellular communication system that operates, in general, in conformity with the operating parameters and protocols set forth in a GSM (Global System for Mobile communications) operating specification. In other implementations, the communication system is representative of cellular communication systems operable pursuant to other operating specifications, such as the aforementioned IS-95 system or an UMTS system. And, more generally, the communication system is representative of any of various types of radio communications that provide for telephonic communications. Accordingly, while exemplary operation of an embodiment of the present invention shall be described with respect to its implementation in a cellular communication system operable in conformity, generally, with a variant of a GSM operating specification, in other implementations, embodiments of the present invention are analogously operable in any of various other radio communication systems.

The communication system includes a fixed network portion with which the mobile node 12 communicates. Communications are effectuated between the network part and the mobile node by way of radio channels defined upon radio links extending between the network part and the mobile node. Data communicated by the network part to the mobile node is communicated upon downlink channels defined upon a radio downlink. And, data communicated by the mobile node to the network part is communicated upon uplink channels defined upon a radio uplink. Here, the downlink is represented by the arrow 14 extending between the network part and the mobile node. And, the uplink is represented by the arrow 16 extending between the mobile node and the network part. Control data and traffic data are both communicated upon various channels defined upon the downlink and uplink.

The network portion of the communication system is here shown to include two GSM networks, a first GSM network 18 and a second GSM network 22. The networks 18 and 22 are connected together, in conventional manner, by way of a signaling network, here an SS7 signaling network 24. Other signaling networks, in other implementations, interconnect the networks 18 and 22. For instance, in one other implementation, an X.25 network interconnects the GSM networks 18 and 22.

The GSM networks 18 and 22 are each operable pursuant to a variant of the GSM operating specification. Each of the networks is formed of radio network elements that permit telephonic communication with the mobile station 12 when the mobile station is positioned within the coverage area encompassed by the separate networks. Each network includes, for instance, a base transceiver station (BTS) 26 and a base station controller (BSC) 28 coupled thereto. The base transceiver station includes radio transceiver circuitry to transceive data communicated upon the downlink and uplink channels with mobile stations, such as the mobile station 12. The base station controller, in turn, is coupled to a mobile switching center/visited location register (MSC/IVLR) 32. A home location registers (HLR) 34 is also shown to form a portion of each of the GSM networks, functionally coupled to an associated mobile switching center/visited location register.

Each of the networks 18 and 22 also includes a short message service (SMS) center (SMS-C) 38. The short message service centers are each operable to form SMS messages and selectably to send SMS messages to mobile stations, such as the mobile station 12. Of particular significance to an embodiment of the present invention, the SMS center sends selected SMS messages pursuant to registration of a mobile node with which the short message service center is associated.

The SS7 network 24, or other analogous network, that interconnects the networks 18 and 22, forms a signaling network for providing signaling, and other, connections between the networks. The signaling network is here shown also to include a switching node that forms a signaling transfer point (STP). Other types of networks, other than the GSM networks 18 and 22, are also connectable to the SS7 network 24. A public-switched telephonic network or an integrated service digital network, for example, are each also connectable to the SS7 network.

An exemplary service center, here a service center 44, is functionally coupled to the SS7 network. The service center 44 is connected, for instance, by way of a public switched telephonic network or integrated service digital network to the SS7 network. A service center is, alternately, connectable to the network part of the communication system at another location or by way of another connection. The service center 44 is representative of any calling location identified by a coded sequence of digits. More particularly, here, the exemplary service center is representative of a calling location identified by a first short code at the first network 18 and identified by a second code at the second network 22.

The service center 44 is representative, for instance, of an emergency dispatch center. As noted previously, the emergency dispatch center is identified, in different areas, by different short dialing codes. In one area, for instance, the center is identified by the short dialing code 9-1-1. And, in another area, the service center is identified by the short dialing code 9-9-9. The service center 44 is alternately representative of, for instance, a directory service center. In some areas, the directory service center is identified by a first short dialing code, such as 4-1-1. And, in other areas, the directory service center is identified by a second short dialing code, such as 1-9-2. And, the service is also alternately representative of an operator assistance center that, for instance, is identified by the dialing code of '0' and in other areas, by the dialing code of 1-0-0. Various other service centers are also represented by the exemplary service center 44, accessible telephonically through entry of an appropriate short dialing code.

A call connection is formed with the service center through call set-up procedures when a call is originated at an originating calling station, such as the mobile node 12.

The mobile node includes, in conventional manner, a user interface, typically including a telephonic keypad actuable by a user to initiate a phone call, such as a call to the service center. In the Figure, the mobile node is shown to include a user interface 48, formed of a user input actuator 50 and a user display 52.

When a user of the mobile node initiates a call to a selected service center, the user actuates the actuation keys of the telephonic keypad to enter the dialing code associated with the user of the mobile node intends to communicated telephonically pursuant to a call connection formed with a called station. And, more particularly, here, when the user intends to place a call to the service center 44, the user enters the short dialing code associated with the service center. Because the short dialing code that is associated with the service center might differ, depending upon with which of the networks that the mobile node is registered, proper routing of the call to the service center to permit a call connection to be formed therewith requires that the dialing digits used in the network through which the mobile node communicates when requesting the call be used.

Operation of an embodiment of the present invention provides a manner by which better to ensure that the correct short dialing code is used when requesting a call connection to be formed with a service center. And, pursuant to an embodiment of the present invention, the mobile node includes apparatus 58 of an embodiment of the present invention.

When a mobile node is initially turned-on, enters the coverage area of a network, such as the networks 18 or 22, and at additional selected intervals, the mobile node registers with the network part of the communication system. Various conventional procedures are carried out by the communication system pursuant to the registration of the mobile node, including, for instance, authentication of the mobile node to communicate by way of the network part of the communication system. Additionally, pursuant to an embodiment of the present invention, during registration procedures, the SMS service center of the network with which the mobile node is registering, generates and causes to be communicated to the mobile node an SMS message. The SMS message includes values that identify the short dialing codes used in the network to identify selected service centers. Thereby, the mobile node is provided with the short dialing codes used in the network to which the mobile node becomes registered. The information contained in the SMS message is thereafter utilized by the mobile node when a call is placed to a selected service center.

The elements of the apparatus 58 embodied at the mobile node are functionally represented. And, the functions carried out by the functional elements are carried out in any desired manner, such as, for example, by algorithms executable by processing circuitry.

The apparatus 58 is here shown to include an SMS message detector 62 that is coupled to, or forms part of, the receive circuitry of the mobile node. The SMS message detector operates to detect the SMS message sent to the mobile node.

Detections made by the detector are provided to an indexer 64. The indexer 64 also forms part of the apparatus 58. The indexer includes, or is coupled to, a storage element 66.

The indexer 64 operates to index values of identification codes downloaded to the mobile node as part of the SMS message sent during registration procedures and detected by the detector 62 together with permanently stored values of the identification codes that are associated by the mobile node or the user thereof, with the service centers. The permanently stored values are those, for instance, of the home network in which the mobile node is normally registered. By indexing the permanently stored values with the downloaded values, an association is formed between the separate values, permitting matching of the values and use of the appropriate values when a call is subsequently placed to a selected service center.

The values, indexed together, are stored at the storage element 66. In the exemplary implementation, the storage element is embodied at a SIM card. In an IS-95 system that utilizes R-UIM devices, the storage element is embodied thereat. The values are available for subsequent retrieval when a call is subsequently placed at the mobile node to a selected service center. The values remain stored thereat, in the exemplary implementation, until subsequent registration, and subsequent download of an SMS message alters the values. Thereby, the values of the short dialing digits used in the network with which the mobile node is registered, is updated, as necessary, to ensure that the dialing codes used in the network are always available at the mobile node.

The apparatus 58 further includes a transposer 72 that is coupled to both the indexer and the user input actuator 50 of the user interface 48. When a call is placed by a user of the mobile node to a service center, the transposer is made aware of the call placement. That is, when the user enters a shortened dialing code that the user associates with a service center, the values entered by the user are provided to the transposer. And, responsive to the entered code, the transposer operates to transpose the entered values with the values stored at the storage element 56 if the values differ. The substitute values are then provided to a transmit part of the mobile node, and normal call procedures are utilized to place the call to the service center. A call connection that would otherwise not be made to the selected service center is, through operation of the apparatus 58, formed. And, services are then able to be provided by the service center.

The transposing of the entered short dialing code into the dialing code needed to form the call connection in the area encompassed by the network with which the mobile node is registered is performed automatically, without need of the user to know of the transposing of the dialing codes.

Figure 2:
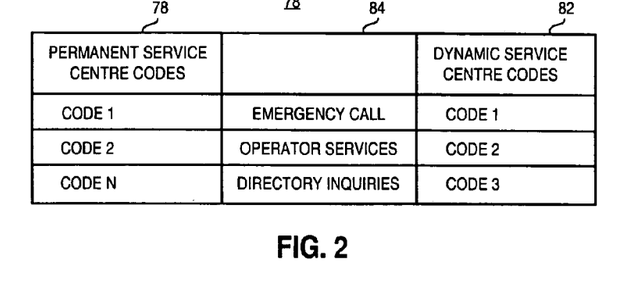
FIG. 2 illustrates a representation of dialing codes stored pursuant to operation of an embodiment of the present invention and their indexing theretogether also pursuant to operation of an embodiment of the present invention.

FIG. 2 illustrates a representation, shown generally at 76, representative of dialing codes stored at the storage element 66. A first set of codes is designated in the column 78 as the permanent service center codes that are used at the home network associated with the mobile node. And, a second set of codes, indicated at the column 82, are used in the network with which the mobile node is registered, downloaded to the mobile node pursuant to registration procedures, to be stored at the storage element, and dynamically updated as appropriate. Each of the codes is identified by a purpose, here represented by the entries in the column 84.

In the exemplary implementation in which the mobile node forms a GSM mobile terminal, the storage element 66 is embodied at the SIM card of the mobile node. In an alternate implementation, the SMS message that is delivered to the mobile node is used to form a database of all of the networks into which the mobile node might roam. In this implementation, an SMS message need not be delivered to the mobile node with each registration of the mobile node in a new network. Additional storage capacity is required at the SIM, in such an implementation, for the storage of the lists of information.

Figure 3:
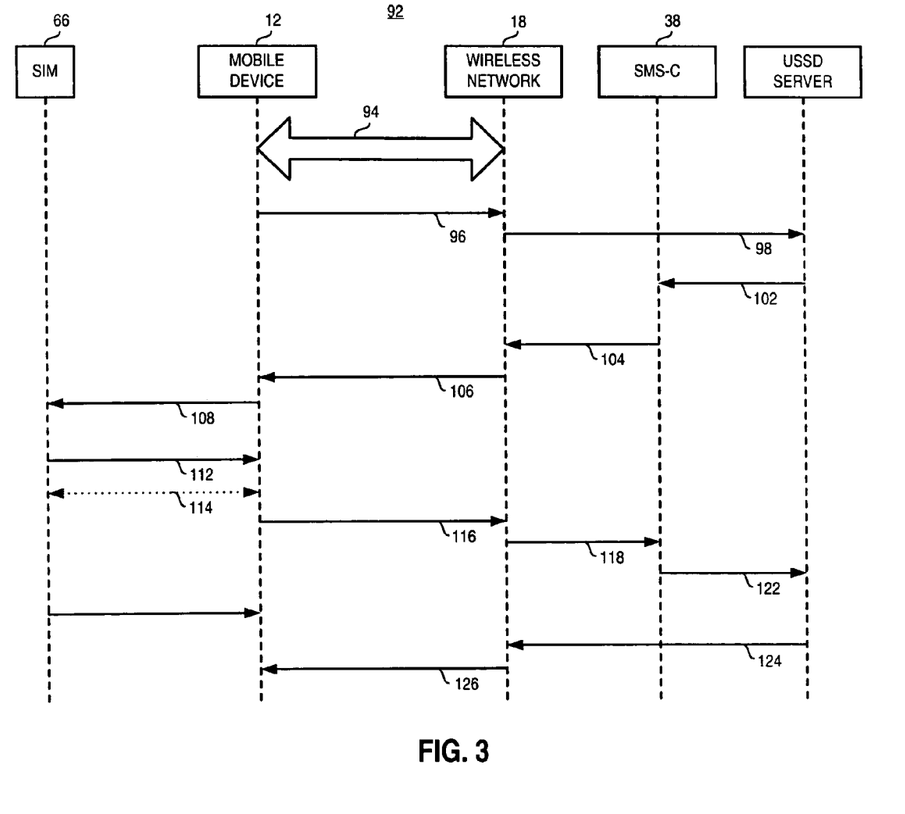
FIG. 3 illustrates a message sequence diagram representative of signals generated during operation of an embodiment of the present invention.

FIG. 3 illustrates a message sequence diagram, shown generally at 92, representative of operation of the communication system 10, shown in FIG. 1 pursuant to operation of an embodiment of the present invention. Again, operation is described with respect to an implementation in which the communication system forms a GSM system. Analogous operation can be described with respect to a system that is operable pursuant to another operating standard.

The mobile station initiates registration with the network, here the network 18, and registration procedures are carried out, as indicated by the segment 94. And, as indicated by the segment 96, a mobile originated USSD is generated by the mobile node and sent to the wireless network. The wireless network, in turn, forwards on a request for operator specific short codes, indicated by the segment 98, that are delivered to the USSD service center. The codes are retrieved and returned, indicated by the segment 102, to the SMS center. The SMS center, in turn, generates an SMS message, indicated by the segment 104, that contains the operator specific short codes of the service centers. An SMS message is sent, indicated by the segment 106, over a radio downlink channel, to be delivered to the mobile node. In the exemplary implementation, the SMS message is an envelope message that is passed by the receive circuitry of the mobile node to the storage, here the SIM card. Forwarding of the encapsulated message is indicated by the segment 108. When the information is stored at the SIM card, a terminal response, indicated by the segment 112, is provided. The mobile node is capable of accessing the contents of the SIM card, here indicated by the segment 114.

The message sequence diagram also illustrates return of a mobile terminated response, indicated by the segment 116, sent by the mobile node to the wireless network 18, and an acknowledgment message passed on, indicated by the segment 118, to the SMS center and, as indicated by the segment 122, to the USSD server. A request operator specific short codes acknowledgment is then returned, indicated by the segment 124, to the wireless network and, in turn, to the mobile device, indicated by the segment 126.

Figure 4:
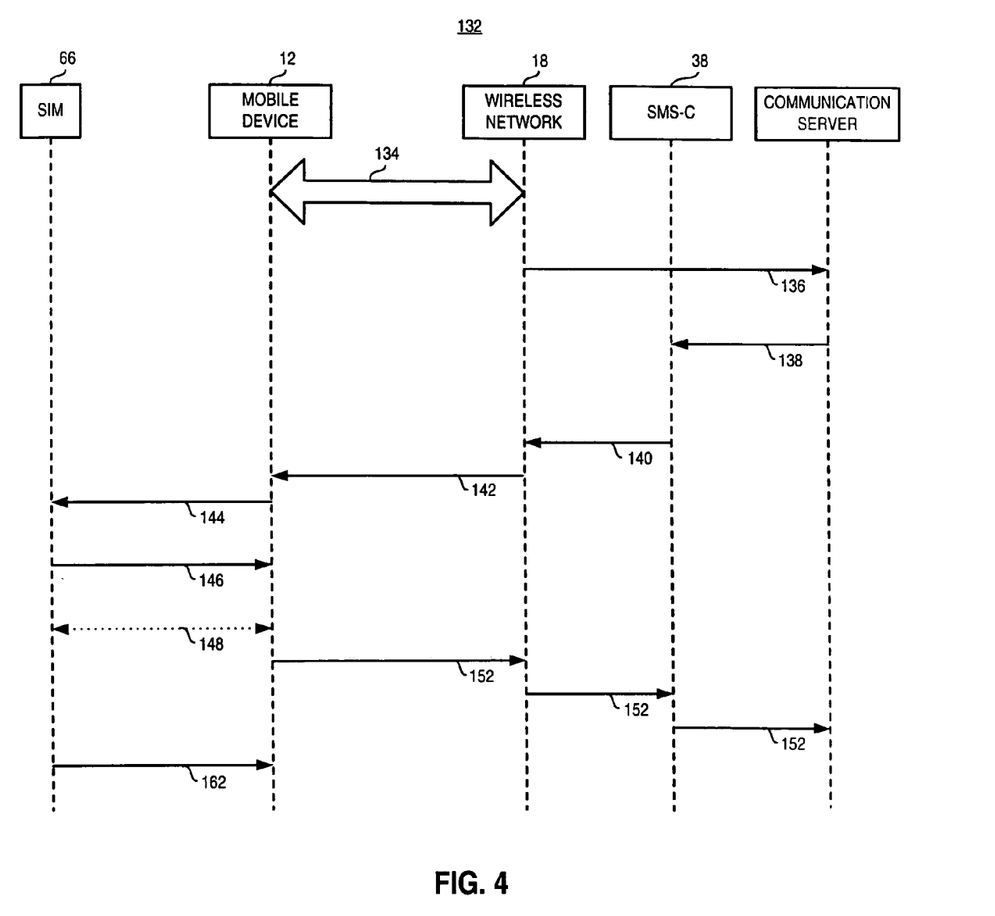
FIG. 4 illustrates an exemplary message generated during operation of an embodiment of the present invention by which to provide a mobile node with indications of short dialing codes used in an area at which the mobile node is positioned.

FIG. 4 illustrates another message sequence diagram, shown generally at 132. The message sequence diagram 132 is representative of further operation of the communication system pursuant to an embodiment of the present invention. First, and as indicated by the segment 134, the mobile node registers with a wireless network, here again the wireless network 18, and convention registration procedures are carried out. Then, and as indicated by the segment 136, an initial DP is forwarded by the wireless network to the communication server. A command, indicated by the segment 138, is returned to the SMS service center to send codes to the mobile station. And, as indicated by the segment 140, a download operator specific short code message is provided to the wireless network, and short message service message is sent, as indicated by the segment 142 to the mobile node. An encapsulated SMS message is forwarded by the mobile node to the SIM card, indicated by the segment 144. A terminal response is provided, indicated by the segment 146. Thereafter, a get response procedure is carried out, indicated by the segment 148. A mobile terminated response is formed and sent, indicated by the segment 152 to the wireless. Messages are forwarded, indicated by the segments 154 and 156 to the c-server. A subsequent file change notification message, indicated by the segment 158 selectably provided by the SIM card to the mobile node structure.

The previous descriptions are of preferred examples for implementing the invention, and the scope of the invention should not necessarily be limited by this description. The scope of the present invention is defined by the following claims:

The invention claimed is:

1. Apparatus for a radio communication system having a mobile node operable to communicate with a network part of a communication network, and at least a first service center coupled to the network part, the mobile node associated with a home network of the communication network a call originated at the mobile node selectably routable to a selected one of the at least the first service center to form a call connection therebetween, said apparatus for facilitating routing of the call to the selected one of the at least the first service center, said apparatus comprising:

a first storage element configured to store first codes that identify at least the first service center when the mobile node is positioned at the home network, a selected one of the first codes entered at the mobile node when initiating origination of the call to the selected one of the at least the first service center;

a second storage element configured to store second codes used at a non-home network part of the communication network at which the mobile node is presently registered;

an indexer coupled to said first storage element and to said second storage element, said indexer configured to receive second codes, store said second codes in said second storage element and to index together the selected one of the first codes, when used to initiate the origination of the phone call, to a corresponding one of the second codes; and a message detector coupled to the indexer, the message detector configured to receive a short message service (SMS) message received by the mobile node pursuant to mobile-node registration, the SMS message comprising second codes encapsulated in an envelope command message, the message detector additionally configured to recover from the SMS message, second codes and to provide the recovered second codes to the indexer for storage into the second storage element, wherein the network part of the communication network includes a first network portion and a second network portion, the first network portion configured to use a first set of the second codes and the second network portion configured to use a second set of the second codes and wherein the first network portion comprises a first coverage area and the second network portion comprises a second coverage area, and wherein the mobile node registers with the network part when passing from the first to the second coverage area, and, upon registering, storing the second set of the second codes in place of the first set of the second codes at said second storage element.

2. The apparatus of claim 1 wherein the mobile node comprises a transmit part and wherein said indexer is further configured to provide indications of the corresponding one of the second codes to the transmit part pursuant to the origination of the call to the selected one of the first service center.

3. The apparatus of claim 1 wherein said second storage element comprises an updateable subscriber identity module (SIM) storage element configured to permit updating of the second codes.

4. Apparatus for a radio communication system having a mobile node operable to communicate with a network part of a communication network, and at least a first service center coupled to the network part, the mobile node associated with a home network of the communication network a call originated at the mobile node selectably routable to a selected one of the at least the first service center to form a call connection therebetween, said apparatus for facilitating routing of the call to the selected one of the at least the first service center, said apparatus comprising:

a first storage element configured to store first codes that identify at least the first service center when the mobile node is positioned at the home network, a selected one of the first codes entered at the mobile node when initiating origination of the call to the selected one of the at least the first service center;

a second storage element comprising an updateable subscriber identity module (SIM) storage element configured to store second codes used at a non-home network part of the communication network at which the mobile node is presently registered and configured to permit updating of the second codes;

an indexer coupled to said first storage element and to said second storage element, said indexer configured to receive second codes, store said second codes in said second storage element and to index together the selected one of the first codes, when used to initiate the origination of the phone call, to a corresponding one of the second codes, wherein the network part of the communication network includes a first network portion and at least a second network portion, the first network portion configured to use a first set of the second codes and the second network portion configured to use a second set of the second codes, the second codes stored at said second storage element formed of the first set when the mobile node is associated with the first network portion and the second value stored at said second storage element formed of the second set when the mobile node is associated with the second network portion; and a message detector coupled to the indexer, the message detector configured to receive a short message service (SMS) message received by the mobile node pursuant to mobile-node registration, the SMS message comprising second codes encapsulated in an envelope command message, the message detector additionally configured to recover from the SMS message, second codes and to provide the recovered second codes to the indexer for storage into the second storage element.

5. The apparatus of claim 1 wherein the mobile node comprises a memory card at least releasably engageable therewith and wherein said first storage element and said second storage element are embodied thereat.

6. The apparatus of claim 5 wherein the radio communication system comprises a Global System for Mobile communications—compliant system and wherein the memory card at which said first and second storage elements, respectively, are embodied comprises a Subscriber Identity Module card.

7. The apparatus of claim 1 wherein said indexer is further adapted to receive indications of initiation of the origination of the phone call and wherein said indexer operates responsive thereto to index together the selected one of the first codes to the corresponding one of the second codes.

8. The apparatus of claim 7 wherein the mobile node comprises a user interface, wherein the user initiates the origination of the call by way of the user interface and wherein said indexer is coupled to the user interface.

9. A method of communicating in a communication system having a mobile node operable to communicate with a network part of a communication network, and at least a first service center coupled to the network part, the mobile node associated with a home network of the communication network a call originated by the user at the mobile node selectably routable to a selected one of the at least the first service center to form a call connection therebetween, said method for facilitating routing of the call to the selected one of the at least the first service center, said method comprising:

storing first codes that identify at least the first service center when the mobile node is positioned at the home network, a selected one of the first codes, when initiating origination of the call to the selected one of the at least the first service center;

detecting at a message detector for said mobile node, second codes within a short message service (SMS) message received pursuant to mobile node registration, the SMS message comprising second codes encapsulated in an envelope command message, the second codes within the SMS message identifying the at least the first service center, the second codes used at a non-home network part of the communication system at which the mobile node is presently registered;

indexing together the selected one of the first codes, when used initiate the origination of the phone call, to a corresponding one of the second codes; and storing the second codes detected by said message detector, and which identify the at least the first service center, the second codes used at the non-home network part of the communication network at which the mobile node is presently registered; and registering by the mobile node with the network part, which includes a first network portion comprising a first coverage area and a second network portion comprising a second coverage area, when passing from the first to the second coverage area, and, upon registering, storing a second set of the second codes in place of a first set of the second codes at said second storage element, the first network portion configured to use the first set of the second codes and the second network portion configured to use the second set of the second codes.

10. The method of claim 9 wherein the mobile node further comprises a transmit part and wherein said method further comprises the operation of providing the corresponding one of the second codes, indexed together with the selected one of the first codes during said operation of indexing, to the transmit part to be transmitted therefrom.

11. The method of claim 9 wherein the second codes stored during said operation of storing the second codes are provided to the mobile node during registration of the mobile node with the network part of the radio communication system.

12. The method of claim 9 wherein the communication system is a radio communication system, which provides for short message service messaging, said method further comprising the operation, prior to said operation of storing the second codes, of sending an Envelope command message to the mobile node, the second codes contained in the Envelope command message.

13. The method of claim 12 wherein the mobile node comprises a receive part and a storage element at which the second codes are stored during said operation of storing, and wherein said method further comprises the operations of:
   detecting the Envelope command message at the receive part; and
   forwarding on the Envelope command message to the storage element.

14. The method of claim 13 further comprising the operation of acknowledging storage of the second codes contained in the Envelope command message at the storage element.

15. The apparatus of claim 1, wherein the first and second codes comprise short dialing codes.

16. The apparatus of claim 1, wherein the second storage element is removable.

17. The method of claim 9, wherein the first and second codes comprise short dialing codes.

18. The apparatus of claim 4 wherein the first network portion defines a first coverage area and the at least the second network portion defines at least a second coverage area, wherein the mobile node registers with a selected one of the first network portion and the at least the second network portion corresponding to in which of the first and at least second coverage areas, respectively, that the mobile node is positioned, and wherein the second codes stored at said second storage element are provided thereto pursuant to registration of the mobile node.

19. The apparatus of claim 18 wherein the mobile node comprises a transmit part and wherein said indexer is further configured to provide indications of the corresponding one of the second codes to the transmit part pursuant to the origination of the call to the selected one of the first service center.

20. The apparatus of claim 18 wherein the mobile node comprises a memory card at least releasably engageable therewith and wherein said first storage element and said second storage element are embodied thereat.

21. The apparatus of claim 20 wherein the radio communication system comprises a Global System for Mobile communications-compliant system and wherein the memory card at which said first and second storage elements, respectively, are embodied comprises a Subscriber Identity Module card.

22. The apparatus of claim 18 wherein said indexer is further adapted to receive indications of initiation of the origination of the phone call and wherein said indexer operates responsive thereto to index together the selected one of the first codes to the corresponding one of the second codes.

23. The apparatus of claim 22 wherein the mobile node comprises a user interface, wherein the user initiates the origination of the call by way of the user interface and wherein said indexer is coupled to the user interface.

* * * * *

UNITED STATES PATENT AND TRADEMARK OFFICE
CERTIFICATE OF CORRECTION

PATENT NO. : 7,917,136 B2
APPLICATION NO. : 11/302888
DATED : March 29, 2011
INVENTOR(S) : Adrian Buckley et al.

Page 1 of 1

It is certified that error appears in the above-identified patent and that said Letters Patent is hereby corrected as shown below:

Col. 14, Claim 19, Line 8, please delete "claim 18", and insert "...claim 4...".

Col. 14, Claim 20, Line 13, please delete "claim 18", and insert "...claim 4...".

Col. 14, Claim 22, Line 22, please delete "claim 18", and insert "...claim 4...".

Signed and Sealed this
Twenty-seventh Day of September, 2011

David J. Kappos
*Director of the United States Patent and Trademark Office*